United States Patent
Vasnani et al.

(10) Patent No.: US 7,640,578 B2
(45) Date of Patent: Dec. 29, 2009

(54) SYSTEM AND METHOD FOR PROVIDING SECURE COMMUNICATION BETWEEN COMPUTER SYSTEMS

(75) Inventors: Vinod Vasnani, Singapore (SG); Nikhil Jhingan, Singapore (SG); Soo Ying Ng, Singapore (SG); HanSeah Sim, Singapore (SG); Chee Siang Lim, Singapore (SG); Kelvin Wee Ming Lee, Singapore (SG); Mathieu Legrand, Singapore (SG)

(73) Assignee: Accellion Inc., Palo Alto, CA (US)

( * ) Notice: Subject to any disclaimer, the term of this patent is extended or adjusted under 35 U.S.C. 154(b) by 616 days.

(21) Appl. No.: 10/191,984

(22) Filed: Jul. 8, 2002

(65) Prior Publication Data

US 2004/0006693 A1 Jan. 8, 2004

(51) Int. Cl.
*G06F 7/04* (2006.01)
(52) U.S. Cl. .................................. 726/10; 726/9
(58) Field of Classification Search ............... 726/9
See application file for complete search history.

(56) References Cited

U.S. PATENT DOCUMENTS

| | | | |
|---|---|---|---|
| 5,349,642 A * | 9/1994 | Kingdon | 713/161 |
| 5,495,533 A * | 2/1996 | Linehan et al. | 713/155 |
| 5,606,609 A * | 2/1997 | Houser et al. | 713/179 |
| 5,931,947 A * | 8/1999 | Burns et al. | 726/4 |
| 6,157,722 A * | 12/2000 | Lerner et al. | 380/260 |
| 6,654,795 B1* | 11/2003 | Coile | 709/219 |
| 7,334,126 B1* | 2/2008 | Gilmore et al. | 713/168 |
| 2002/0083178 A1* | 6/2002 | Brothers | 709/226 |
| 2002/0147929 A1* | 10/2002 | Rose | 713/201 |
| 2002/0169961 A1* | 11/2002 | Giles et al. | 713/175 |

* cited by examiner

*Primary Examiner*—Emmanuel L Moise
*Assistant Examiner*—David J Pearson
(74) *Attorney, Agent, or Firm*—Pillsbury Winthrop Shaw Pittman LLP

(57) ABSTRACT

A secure method for requesting resources in a distributed computer network is described. The method comprises of a means of securely integrating a request for a resource along with its validation and authentication from a first server with restrictions for the request such as expiry date and IP address as well as other request parameters. The resulting request is placed on a second server which is capable of decoding and responding to the request or redirects the request securely to a third computer to respond.

28 Claims, 9 Drawing Sheets

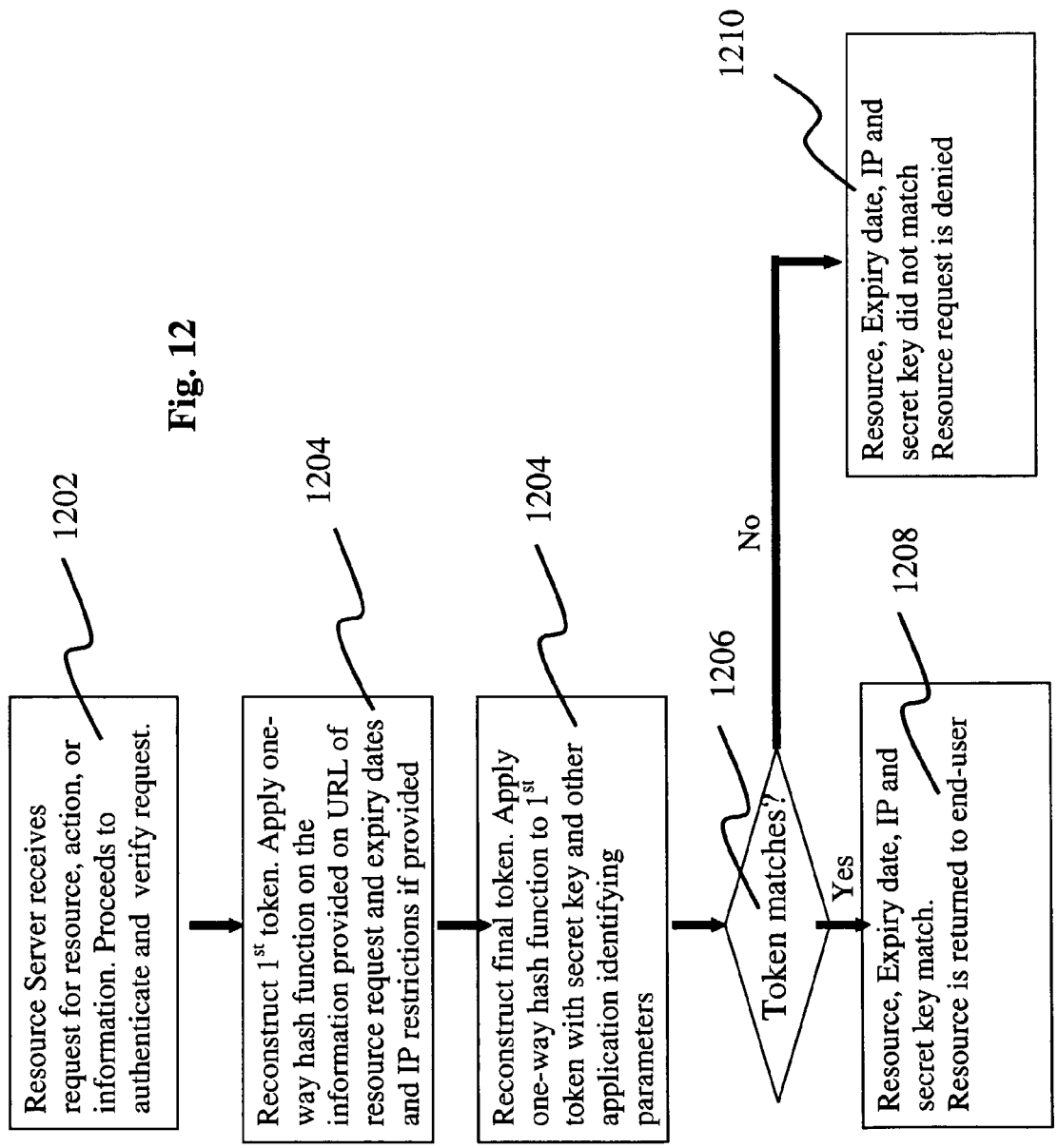

SYSTEM AND METHOD FOR PROVIDING SECURE COMMUNICATION BETWEEN COMPUTER SYSTEMS

BACKGROUND OF THE INVENTION

1. Field of Invention

The invention relates generally to communication between computer systems. In particular, the invention relates to the security of data requests during communication between computer systems involving authentication and verification of such requests.

2. Background

The explosive growth of the World Wide Web ("Web") has significantly increased the number of organizations using the Internet for business purposes. While businesses initially used the Internet to offer services to end consumers, these businesses are increasingly using the Internet to communicate with other businesses for commercial and the like economically motivated purposes as well. Hence there is a general need for computers in these two disparate business models, i.e. the business-to-consumer and business-to-business models, respectively, to communicate with each other.

Such communication can be classified into a request-response type of communication where a request, which is typically an instruction or the like structured data, can be issued for retrieving or processing information or content such as a file, and a response to the request can be appropriately a delivery of information or content, whether processed or not. Typically, such request-response form of communication between businesses is required to be secure and authenticated. As an example, when Business A issues a request asking for a file or the like content from Business B either for itself or to be delivered to an end-consumer, Business B has to ensure that the request did originate from Business A as well as ensure the integrity of the request by authenticating and verifying, respectively, the request.

One popular method of enabling communication between disparate systems over the Internet that has emerged recently is the use of the eXtended Markup Language (XML) for communication. This type of "rich" language provides computers and computer systems means for requesting and exchanging information. To implement a communication scheme using XML messages or scripts typically requires the relevant parties to agree to various terms with regard to the format and structure of the communication scheme, and the parties to have the appropriate tools to parse and process the XML scripts.

In such a communication scheme, an initial exchange of information such as passwords or keys takes place to generate a session key which is valid for a period of time. The session key is then used to authenticate requests for information. The passwords or keys can be encrypted using Secure Socket Layer (SSL). In situations where security is critical, the requested information can be encrypted as well. This in turn requires the receiving party to decrypt the requested information.

Such an approach requires the computer systems requesting and receiving the information to be tightly coupled as there is a requirement for both parties to agree on the format and structure of the XML scripts and be able to parse the same. This approach involves a number of interactions for a request to be authenticated, and additional steps are required if encryption is involved. Hence this approach is time-consuming due to the number of steps involved. It also places additional burden on businesses as separate agreements have to be reached with separate business partners.

However in many situations, the need for shorter response times and reality of businesses having multiple business partners require a more simplified communication scheme.

There is therefore a need for a communication scheme for enabling communication between computers in a network in which requests for information are authenticated and verified to facilitate efficient and secure information exchange between the computers.

SUMMARY

In the disclosure of computer network systems and related methods hereinafter, computer systems of distributed network applications are enabled for communicating with each other in an efficient and secure manner involving network resource calls and tokens, for example Uniform Resource Locators (URLs) in the case of distributed Internet applications, that encapsulate resource requests and information for authentication and verification of the resource requests. Authentication as well as verification of a request can be performed during a single request call by using the same key for authentication and encryption of the request. Furthermore, users of the computer network systems are given the flexibility to determine the extent of security to implement during the same single request call.

Preferably, a method of authenticating and verifying requests in respect of distributed network applications using a shared-key methodology is applied. In this methodology, a secret key that is known only to the relevant communicating parties is used to authenticate and verify a request for initiating the exchange and/or processing of information in relation to the communicating parties.

In a client-server distributed network environment, a client that issues a request first computes a one-way hash function of the request to generate a first hash value, $H(R)$. The client then concatenates a secret key, $k$, with the first hash value and further computes a one-way hash function of the concatenated string, producing a second hash value, $H(k.H(R))$, which is sent together with the request to a server.

The server then extracts the request from the information sent by the client and computes a one-way hash function of the request to generate a first hash value. The server then uses the secret key known to and stored by the server and the first hash value to generate a second hash value using a concatenation of the two types of information. If the result of the second hash operation performed by the server matches the second hash value sent by the client, the server then accepts the request and reverts to the client with an appropriate response.

Preferably, the client chooses from a number of secret keys that are also known to and stored by the server for performing the second hash operation. The client uses a secret key identifier to indicate to the server which secret key is used to create the second hash value.

Preferably, the level of security implemented in relation to the request is indicated in the request. Such indication of security level can relate to any relevant information, for example an IP address, expiry date, or even a collection of files, on which a one-way hash operation can be performed for generating a first hash value within constraints such as bit length. The details of the request are sent as plain text to the server, and the second hash value generated using the secret key allows the server to authenticate and verify the request. If an unauthorized client attempts to make a request but tampers with or changes the IP address, expiry date or any part of the request, the resultant hash value would not match the one-way hash value embedded in the request and the request would not be accepted.

Preferably, a single authentication and verification token is generated and embedded in the request which is valid for requesting a related set of resources, for example, a set of files that belongs to the same folder. In such a situation the single authentication and verification token can be generated using any part of the details of the folder path instead multiple authentication and verification tokens using the full details of the file paths or file handles. Subsequently the request is honored for all files that belong to the folder. This is useful when the request is for a related set of files without creating a unique token for each of the files.

Therefore, in accordance with a first aspect of the invention, there is disclosed a method for providing secure communication between computing systems, comprising the steps of: applying a first numerical operation to a request code by a first system for generating a first request value, the request code being associated with a system task; concatenating an authentication code to the first request value for generating a first concatenated value; applying a second numerical operation to the first concatenated value for generating a first encoded value; and providing an instruction code to a second system, the instruction code including the first encoded value and the request code, wherein the second system conditionally performs the system task in accordance with the request code.

In accordance with a second aspect of the invention, there is disclosed a system for providing secure communication between computing systems, comprising: means for applying a first numerical operation to a request code by a first system for generating a first request value, the request code being associated with a system task; means for concatenating an authentication code to the first request value for generating a first concatenated value; means for applying a second numerical operation to the first concatenated value for generating a first encoded value; and means for providing an instruction code to a second system, the instruction code including the first encoded value and the request code, wherein the second system conditionally performs the system task in accordance with the request code.

In accordance with a third aspect of the invention, there is disclosed a communication system for facilitating secure communication between systems, comprising: an authentication code; a request code being associated with a system task; a first request value generated by applying a first numerical operation to the request code, the first numerical operation being defined by an administrator; a first concatenated value generated by concatenating the first request value to the authentication code; a first encoded value generated by applying a second numerical operation to the first concatenated value, the second hash value being defined by the administrator; and an instruction code containing the first encoded value and the request code.

BRIEF DESCRIPTION OF DRAWINGS

Embodiments of the invention are described in greater detail hereinafter with reference to the drawings, in which:

FIG. 12 is a flowchart illustrating a process for authenticating and verifying a request delivered to the application server or resource server during the communication sessions of FIG. 4.

DETAILED DESCRIPTION

Embodiments of the invention are described hereinafter for addressing the need for a communication scheme for enabling communication between computers in a network in which requests for information are authenticated and verified to facilitate efficient and secure information exchange between the computers. This need is addressed by a simplified approach of communication which involves the modification of conventional requests for information, such as Uniform Resource Locators (URLs), to enable authentication and verification of such requests to resources over a network, such as the Internet, by embedding in such modified requests information for performing the authentication and verification. In addition, various degrees of security can also be built into the modified requests, hereinafter generally known as requests.

The embodiments of the invention are described in greater details hereinafter with reference to FIGS. 1 to 12.

Figure 1:
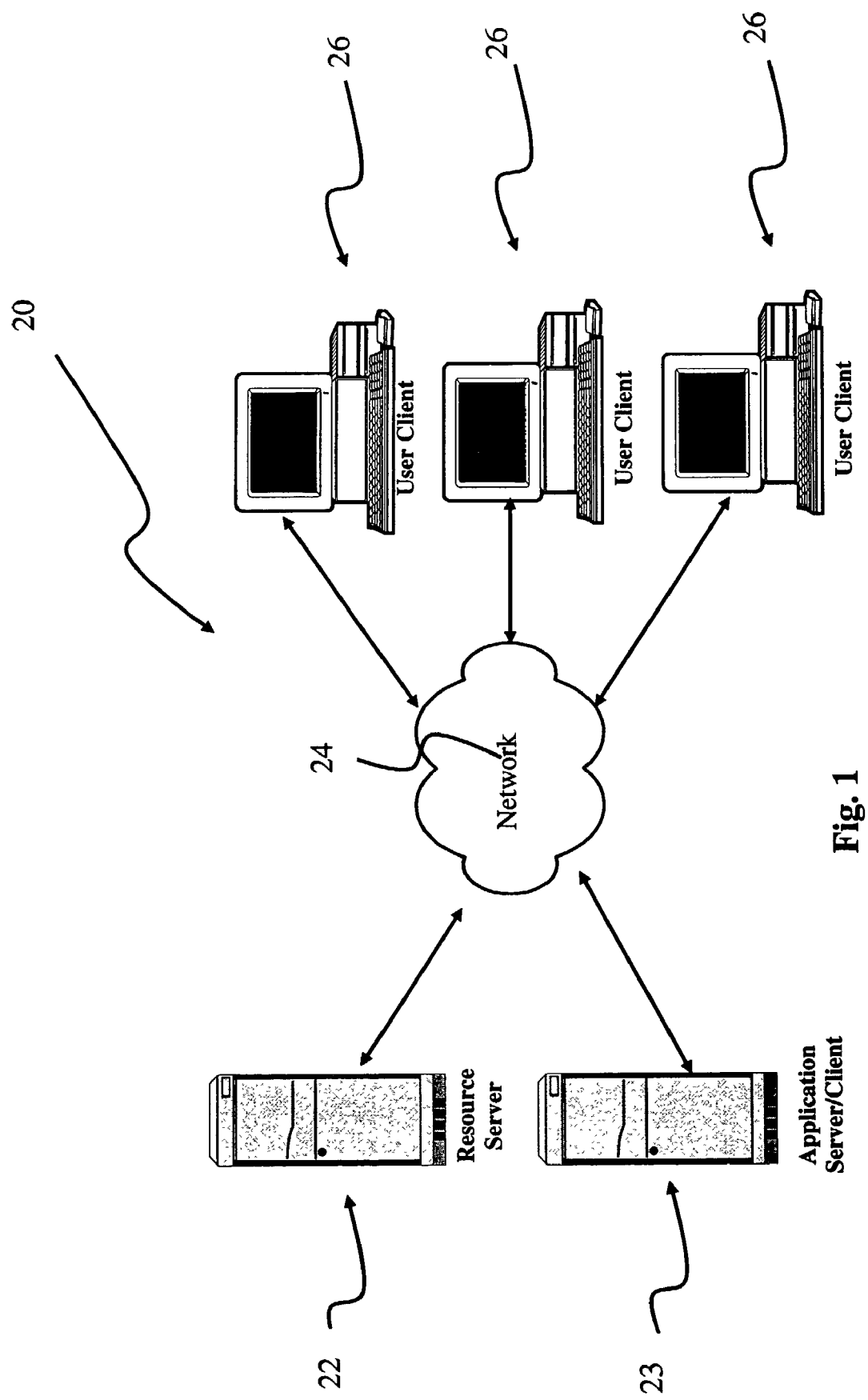
FIG. 1 is a block diagram for illustrating a distributed computer network system in which communication according to embodiments of the invention is enabled.

FIG. 1 is a block diagram for illustrating a distributed computer network system 20 in which communication in accordance to embodiments of the invention is enabled. In FIG. 1, the distributed computer network system 20, hereinafter known as computer system 20, consists of one or more resource servers 22 and application servers 23 connected via a network 24 to one or more distributed end-user clients 26, hereinafter known as clients 26. The computer system 20 is representative of many different distributed computer network systems including conventional file, data, entertainment, e-learning and the like distribution networks. The computer system 20 relies on, for example, a Local Area Network (LAN), a Wide Area Network (WAN), an intranet, or the Internet for providing the networking infrastructure or platform. In the computer system 20, the resource servers 22 and application servers 23 represent network servers or a cluster of servers for serving a website or providing Web service or content. The clients 26 represent workstations or personal computers through which end-users access resources on the Internet, intranet or the like network platform. The network 24 represents the Ethernet, TCP/IP automations or the like networking hardware and uses protocols such as HTTP for serving web pages, RTSP for streaming, or the like protocols for enabling communication within the computer system 20.

In the computer system 20, an authentication and verification system and method thereof, hereinafter known as communication scheme, is employed to enable the clients 26 to request resources from the servers 22/23 in a secure manner. In accordance with the preferred embodiment of the invention, the communication scheme provides for a client 26 to send a request via a HTTP request, which is typically a URL, in the modified form:

http://<server_name>/<hashed token>/<request> in which the server 22/23 identity, a hashed token, and the request are respectively concatenated and presented in a character string.

The hashed token preferably consists of the value of a one-way hash function applied to the concatenated character string of the request and a secret or shared key known only between the application servers 22 and clients 26. Using the hashed token, the communication scheme provides for the application servers 22 to authenticate a request by validating the access rights of the client 26 to the resource requested. A request for resources includes a request for files as well as information such as user lists or file lists. The request can also be a request for an action to be performed, such as to perform a file action on a list of selected files. For example, the application servers 22 can determine using the hashed token that the request is only allowed for the clients 26 that belong to specific IP address ranges or that the request is valid for only a certain period of time or according to any other restriction. In addition, the clients 26 can view a collection of files that match a certain pattern only.

Figure 2:
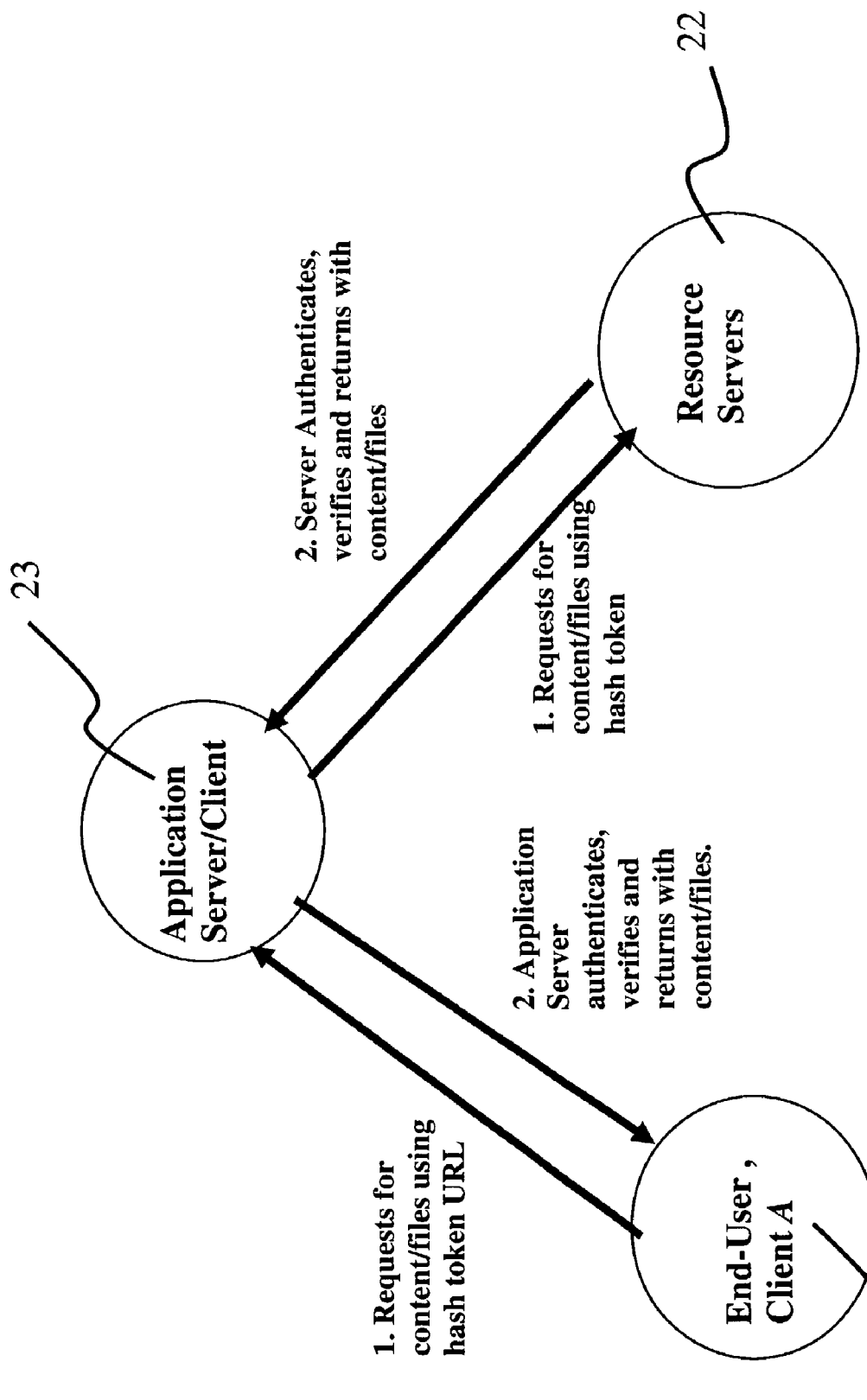
FIG. 2 is a block diagram for illustrating communication sessions between an end-user client and an application server, and between the application server and a resource server in the distributed computer network system of FIG. 1 for requesting resources.
Figure 3B:
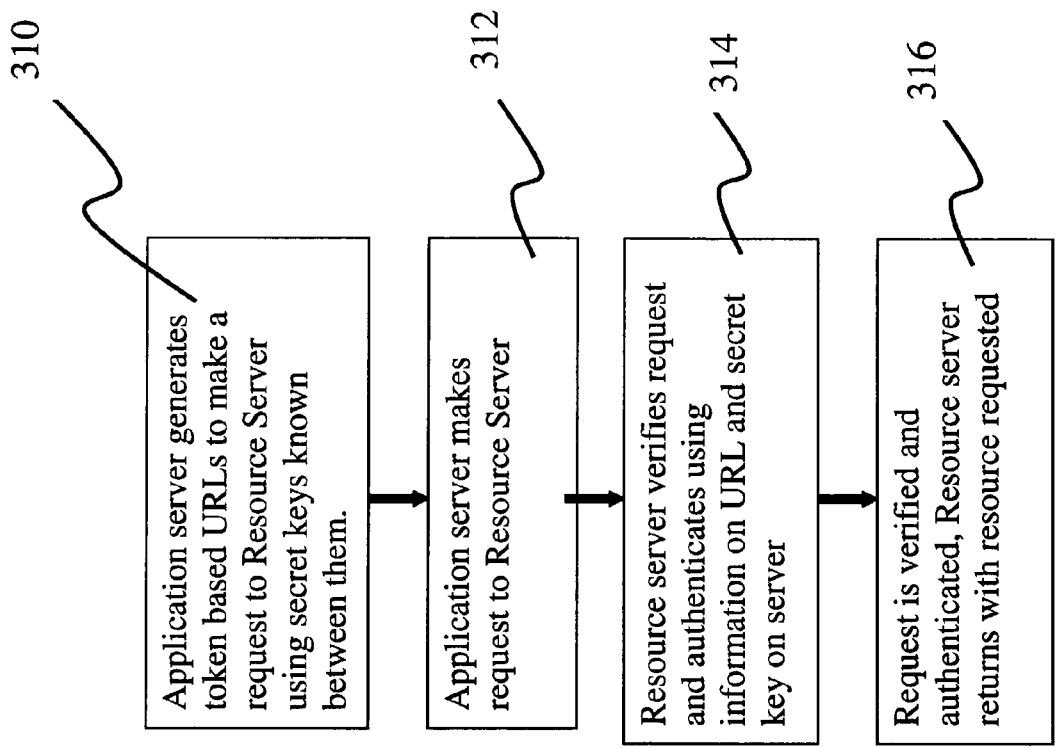
FIGS. 3A and 3B are flowcharts for illustrating processes for requesting for resource during the communication sessions of FIG. 2.
Figure 3A:
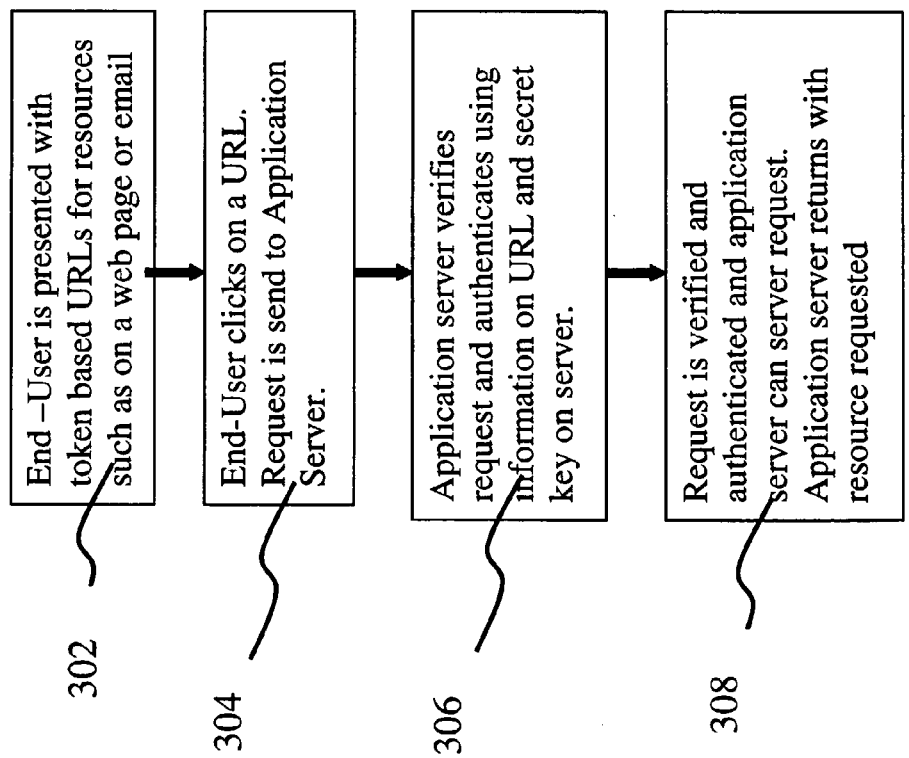

FIG. 2 is a block diagram for illustrating a first communication session between a client 26 and an application server 22 and a second communication session between the application server 22 and a resource server 23 in the computer system 20 for requesting resources, whereas FIGS. 3A and 3B are flowcharts for illustrating respective processes for requesting for resource during these communication sessions. During the first communication session as shown in FIG. 3A, an end-user through the client 26 is presented with a set of hyperlinks, for example URLs, that allows the user to access resources on the application server 23 in a step 302. In this case, the URLs can be presented to the user in a web page or given in an email or the like electronic document. When the user selects any of the hyperlinks thereby sending a corresponding token-based URL and the request embedded therein in a step 304, the application server 23 can then authenticate and verify the request in a step 306. If the request is valid and access is authorized, the requested resource is appropriately delivered to the client 26 in a step 308. In this communication session, only the application server 23 possesses a secret key, which is preferably an authentication code.

In the second communication session as shown in FIG. 3B, the application server 23 assumes the responsibility and role of requesting resources from the resource server 22 instead of the client 26, while the resource server 22 performs authentication and verification of the request. In this case, the application server 23 first generates a token-based URL for the resource requested in a step 310 in which the secret key is known only between the application server 23 and the resource server 22. When the application server 23 sends the token-based URL and the request embedded therein to the resource server 22 in a step 312, the resource server 22 can then authenticate and verify the request in a step 314. If the request is valid and access is authorized, the requested resource is appropriately delivered to the application server 23 in a step 316.

This form of communication according to the communication scheme is suitable for obtaining resources as well as information and performing actions on the resource server 22. The application server 23 may, for example, make a request to obtain a list of resources available on the resource server 22 that matches a certain criteria. In addition, the application server 23 may request the resource server 22 to perform an action on a selected list of files, which may include deleting, copying and moving files to another location.

Figure 4:
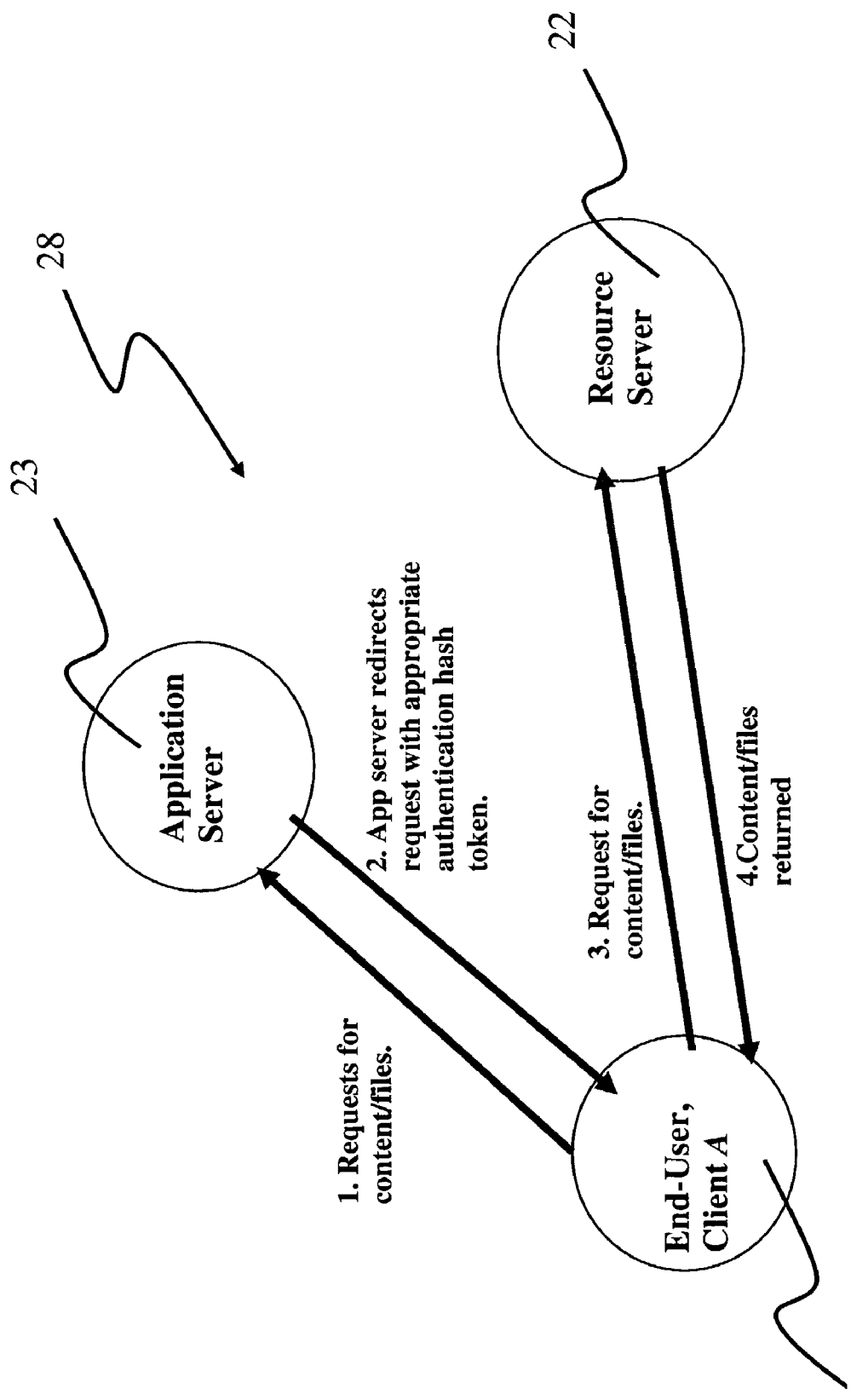
FIG. 4 is a block diagram for illustrating communication sessions during which the end-user client interacts with both the application server and the resource server in the distributed computer network system of FIG. 1 for requesting resources.

The communication scheme also enables an application server 23 to provide a client 26 with a URL to access resource at a resource server 22. FIG. 4 is a block diagram for illustrating communication sessions during which the client 26 interacts with both the application server 23 and the resource server 22 for requesting resources. In this case, an end-user client 26 makes a request for resources to the application server 23. The application server 23 determines the suitability of the request, and generates a URL in relation to the resource with the appropriate expiry date, IP address or other restrictions. The application server 23 then sends that URL to the client 26 to redirect the client 26 to the resource server 22 which then provides the requested resource.

Figures 5, 6:
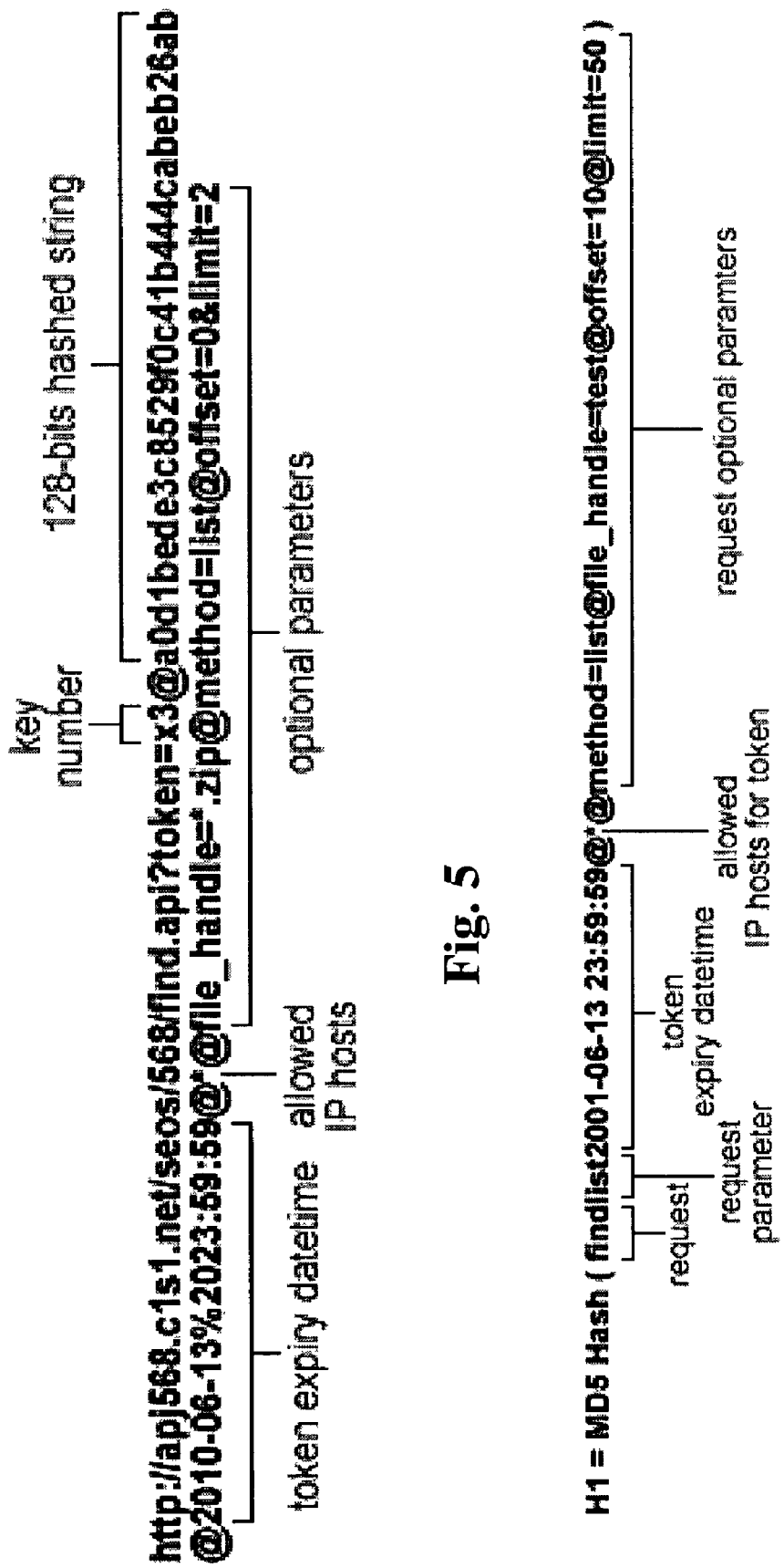
FIG. 5 is a character string representing a token-based URL that is submitted to the resource server by the application server in the distributed computer network system of FIG. 1 for requesting a list of files.
FIG. 6 is an equation for illustrating a hash operation according to the MD5 hash function performed on a request and other parameters, the request and other parameters forming part of a token-based URL according to an embodiment of the invention of FIG. 1.

For purposes of brevity, only the communication session between the application server 23 and the resource server 22 is described hereinafter in greater detail. The processes and operations involved in the communication session, however, can be applied in general to any communication session between any requesting party and any resource provider. FIG. 5 is the character representation of a request originating from the application server 23 for obtaining a list of available files from a resource server 22, in which the request is a token-based URL. The token-based URL includes a key number, a 128-bit hashed token, a token expiry date-time field, allowed IP hosts field, and optional parameters, which are described in greater details hereinafter.

Key Number

A valid key number may for example range from "x0" to "x255". The key number indicates a specific secret key value that is known between the application server 23 and resource server 22 and hence also known as a shared key. For example, specifying "x5" indicates that the sixth key in a list of secret keys is used to generate the 128-bit hashed token for authenticating and verifying the request.

The secret key preferably contains an alphanumeric random value that is known only between the application server 23 and the resource server 22. In selecting secure secret keys, each secret key value should preferably be: at least 16 characters in length; a cryptographically strong random number, not a string that can be easily figured out or can be found in a dictionary; and changed frequently.

128-bit Hashed Token

Figure 7:
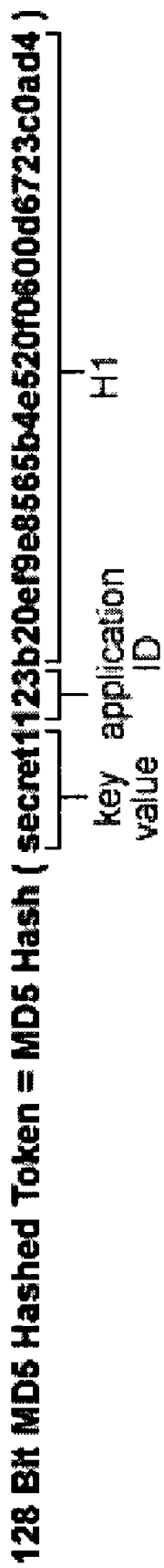
FIG. 7 is an equation for illustrating a hash operation according to the MD5 hash function performed on a secret key and the MD5 hashed value of a request for generating a 128-bit hashed token, the 128-bit hashed token together with the request and other parameters forming part of a token-based URL according to the embodiment of the invention of FIG. 6.

The 128-bit hashed token is described with reference to FIGS. 6 and 7. FIG. 6 is an equation for illustrating a hash operation according to the MD5 hash function performed on the request and other parameters. FIG. 7 is an equation for illustrating a hash operation according to the MD5 hash function performed on the secret key and the MD5 hashed value of the request for generating the 128-bit hashed token, the 128-bit hashed token together with the request and other parameters forming part of the token-based URL.

To obtain the 128-bit hashed token, one-way hash operations are applied to the request. In this case, the MD5 hash function is used in the one-way hash operations. The hashed token is preferably generated by applying a double MD5 hash function to a number of character fields that are concatenated into a character string to make up the request.

In the first MD5 hash operation shown in FIG. 6, the first hash value, H1, is obtained as follows:

H1=MD5-Hash (<request name><request parameters><token expiry date-time>@<allowed IP hosts for token>@<request optional parameters>)

in which the <request name>field represents the request to be called such as GET, LIST, FIND, and the like commands, and the <request parameters>field represents the additional parameters for the request such as delete, replicate, and the like actions. The <token expiry date-time>and <allowed IP hosts>fields are described in greater details hereinafter.

In the second MD5 hash operation shown in FIG. 7, the second hash value, the 128-bit MD5 hashed token, is obtained as follows:

128-bit MD5 hashed token=MD5-Hash (<key value><application id><H1>)

<Token Expiry Date-Time>Field

The <token expiry date-time>field indicates the date and time that the hashed token would expire. The preferred format for indicating the date and time is "YYYY-MM-DD HH:MM:SS", and "*" can be used to indicate that the hashed token has no expiry date.

<Allowed IP Hosts>Field

The <allowed IP hosts>field provides the IP address of the application server 23 allowed to call the token-based URL. A value set to "*" for this field preferably means that no authentication would be performed on the IP address of the application server 23 making the request call. However, using "*" as a wildcard such as specifying 12.25.35.* preferably means only the application servers 23 with IP addresses ranging from 12.25.35.0 to 12.25.35.255 would be allowed to call the token-based URL.

The key component in the token-based URL shown in FIG. 5 for the purposes of authentication and verification is the 128-bit hashed token because an attempt to regenerate this value at the application server 23 or resource server 22 with the information provided in the token-based URL is performed and the result is checked against the 128-bit hashed token embedded in the request. A match between the result and the 128-bit hashed token means that authentication of access rights and verification of the request is achieved.

The communication scheme can also provide for authenticating and enabling end-users to upload files to a server. In this case, similar parameters are preferably used to generate a hashed token. With this capability, an end-user may be restricted for upload by a hashed token that contains restrictions relating to IP address, expiry date, user_id and other parameters.

Figure 8:
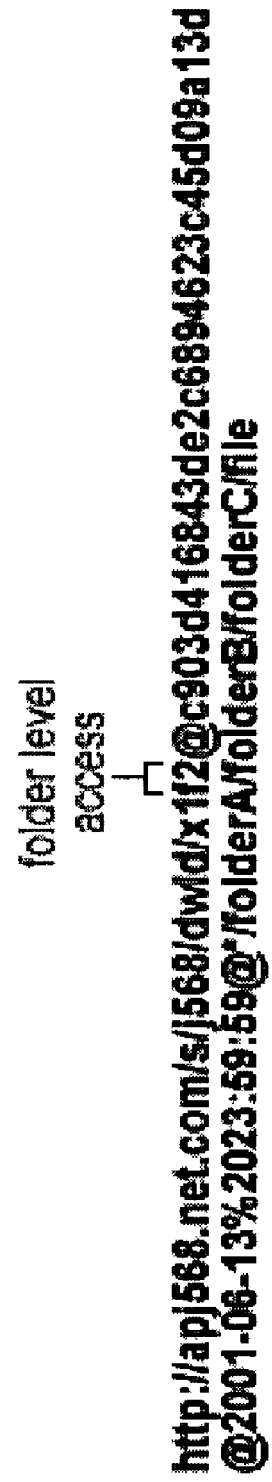
FIG. 8 is a character string representing a token-based URL with folder level access restriction according to a further embodiment of the invention of FIG. 1.
Figures 9, 10:
FIG. 9 is a character string representing a token-based URL with character level access restriction according to still a further embodiment of the invention of FIG. 1.
FIG. 10 is a character string representing a token-based URL for requesting download of a file stored in the application server or resource server in the distributed computer network system of FIG. 1 according to an embodiment of the invention of FIG. 1.

To implement security and flexibility features when requesting for resources, the communication scheme according to further embodiments of the invention provides for additional parameters to be appended to the token-based URL after the key number and correspondingly an optional request parameter to be appended to the character string representing the request on which the first hash operation is performed. Accordingly, a <folder level access>field can be appended to the token-based URL as shown in FIG. 8, which shows a character string representing a token-based URL with folder level access restriction, or a <character level access>can be appended to the token-based URD as shown in FIG. 9, which shows a character string representing a token-based URL with character level access restriction.

<Folder Level Access>Field

The security and flexibility features relating to folder level access restriction is described with reference to FIG. 8. The communication scheme accordingly provides that the value of this field preferably ranges from "f0" to "f[maximum number of path levels in a file handle]", the file handle being the file path of the file requested. For example, a value of "f2" specifies that the second file path level of the file handle would be used when calling the first hash function. Accordingly, if the file handle of the request is "/folderA/folderB/folderC/file", then only the following string "/folderA/folderB" is used in the first hash operation instead of the entire file handle in generating the first hash value, H1. Accordingly any request having the same file handle with a matching string would be authenticated and verified and the request would then be accepted.

If "f0" or no value is specified, the entire file handle would then be used to generate the first hash value. In this case, the hashed token is valid only for the file indicated by the file handle.

<Character Count Access>Field

The security and flexibility features relating to character level access restriction is described with reference to FIG. 9. The communication scheme accordingly provides that the value of this field preferably ranges from "c0" to "c[number of characters in a file handle]". For example, a value of "c5" specifies that the first five characters of the file handle would be used when calling the first hash function. This is a variation of the folder level access feature which allows for finer grain control and also variation in how the file path is delimited. Accordingly, if the file handle of the request is "/folderA/folderB/folderC/file" and "c10" is specified, then the first 10 characters of the string "/folderA/fo" are used to generate the first hash value. Accordingly any request having the same file handle of which the first 10 characters match such a string would be serviced.

If "c0" or no value is specified, the entire file handle would be used to generate the first hash value. In this case, the hashed token is valid only for the file indicated by the file handle.

<Application id>Field

The <application_id>field provides an additional means to identify a party or business requesting the resource.

<Request Optional Parmeter>Field

The <request optional parameter>field allows additional parameters or actions that can be applied to a request to be specified. For example, a request for a list of files matching a certain criteria may be accompanied by a request to delete or email that list of files. This accompanied request can be specified in this field.

Processes in the communication scheme by which hashed tokens are generated and used for authentication and verification are described with reference to FIG. 10 to 12. FIG. 10 shows a character string representing a token-based URL for requesting download of a file stored in the resource server 22, and FIG. 11 shows a flowchart illustrating a process for generating a hashed token which forms part of a request sent during communication sessions between a client 26 and the application server 23.

Figure 11:
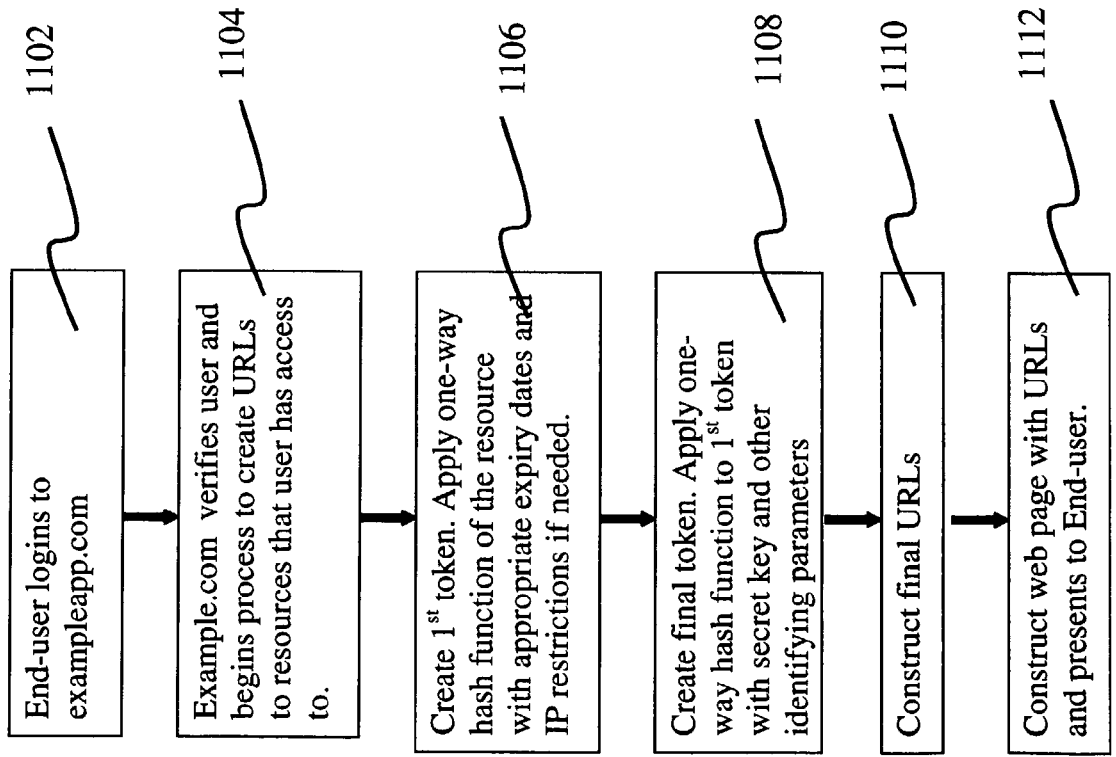
FIG. 11 is a flowchart illustrating a process for generating a security token which forms part of a request sent during the communication sessions of FIG. 4.

The process of FIG. 11 begins when an end-user through a client 26 performs a login into the computer system 20 in a step 1102 for initiating a communication session with an application server 23. Once the application server 23 verifies the user in a step 1104, the application server 23 begins the process of creating URLs that contain the hashed token. The application server 23 firsts generates the first hashed value in a step 1106 using a one-way function, determining the various restrictions to be placed on access, such as those relating to expiry date, IP address, range of files accessed by folder or matching characters and the like restrictions. The application server 23 then in a step 1108 takes the first hashed value and appends a secret key as well as any other application-identifying parameters such as application name or application number to form a string and then generates the second hashed value or hashed token by applying a one-way function of this string. Once completed, the application server 23 generates the final URLs in a step 1110. Finally, the application server 23 constructs a webpage containing such hyperlinks for delivery to the end-user.

FIG. 12 is a flowchart illustrating a process for authenticating and verifying a request delivered to the resource server 22 during the communication sessions between the client 26 and the resource server 22. When information available to construct the first hashed value is passed along with the request itself in a step 1202, the resource server 22 uses the same one-way function to generate the first hashed value in a step 1204. The resource server 22 then takes the result and appends the secret key as well as any application-identifying information to generate the second hashed value or hashed token using the same one-way hash function in a step 1206. If such a hashed token matches in a step 1206 the independent hashed token supplied in the URL, this indicates that the resource requested, IP address, expiry date and other restriction information match what was generated at the application server 23 and the request is then allowed to proceed in a step 1208. If the independently generated hashed tokens do not match, the request is denied in a step 1210.

There are a number of advantages associated with adopting the communication scheme for a client-server method of communication.

Firstly, the communication scheme allows for the application servers 23 to use a plurality of resource servers 22 without the need for tight coupling amongst the servers 22/23. All that is required of the application server 23 is to store the knowledge of the shared keys and the method used to generate the one-way hash values. Also, the application server 23 keeps its structure and only the URLs used for file/content uploads and requests need to be modified using this communication scheme.

Another advantage is that the application server 23 can provide various levels of authenticity and validity of requests to different users by simply generating the appropriate one-way hash values. This is possible as all relevant information regarding authenticity and validity of the request is passed on during the request call. This is achieved without any code modification on the resource server 22 or application server 23.

Yet another advantage is that the communication scheme enabling communication in the computer system 20 can be used for individual files or for a set of files when requesting a download. This is done by specifying the appropriate folder level or character level match when generating the hashed token. This is useful in scenarios such as accessing secure web pages which generally contain several files that belong to a folder.

Still another advantage is that the communication scheme enabling communication in the computer system 20 allows for more than just requesting file downloads. A whole suite of commands and relevant options maybe called this way. Such ease of expandability stems from the simplicity of adding more parameters to the hashed token generation process.

A further advantage is that the communication scheme allows for restrictions to be easily added, such as IP address and expiry date. In particular the IP address restriction allows for the request to be restricted to say an intranet or a corporate wide-area network (WAN).

Still a further advantage is that the communication scheme enabling communication in the communication system 20 does not require the use of user accounts and passwords. Access can be given for resources or a set of resources with an appropriate validity period without giving access to the server 22/23 that holds the resource, thereby reducing the security risk of the server 22/23 itself.

In the foregoing manner, a communication scheme for enabling communication between computers in a network in which requests for information are authenticated and verified to facilitate efficient and secure information exchange between the computers is disclosed. A number of embodiments are described. However, it will be apparent to one skilled in the art in view of this disclosure that numerous changes and/or modifications can be made without departing from the scope and spirit of the invention. For example, other numerical operations may be performed to generate tokens on which the authentication and verification processes rely. These other numerical operations include but are not restricted to other one way hash functions such as SHA as well popular encryption methods such as BlowFish, DES or 3DES.

The invention claimed is:

1. A method for providing secure communication between computing systems, the method comprising the steps of:
   providing a request code by a first system, the request code comprising a file path identifying a resource controlled by a party other than a user requesting a system task associated with said resource;
   generating a first encoded value by the first system based on the request code, based on a selected authentication key from a plurality of authentication keys stored in a non-volatile manner at the first system, and based on a selected length of said file path;
   providing an instruction code to a second system in a communication session between the first and second systems, the instruction code including the first encoded value, a key data identifying the selected authentication key, the request code, and access level data identifying said selected length of said file path;
   generating a second encoded value by the second system based on the request code included in the received instruction code, based on said same selected length of said file path, and based on said same selected authentication key from the same plurality of authentication keys stored in a non-volatile manner at the second system for authentication in two or more consecutive communication sessions using the same selected authentication key, said same selected authentication key being identified at the second system based on the key data included in the received instruction code; and performing the system task in accordance with the request code if the second encoded value matches the first encoded value included in the received instruction code;

wherein said access level data identifies a number of folder levels of said file path.

2. The method as claimed in claim 1, wherein the step of providing the instruction code to the second system comprises the steps of:

presenting the instruction code on a third system to the user requesting said system task for activation; and forwarding the instruction code by the third system to the second system upon activation by the user.

3. The method as claimed in claim 1, wherein the steps of generating the first encoded value by the first system and generating the second encoded value by the second system comprise utilising a same one-way numerical function.

4. The method as claimed in claim 3, wherein the numerical function comprises a first numerical function to generate an intermediate encoded value based on the request code, and a second numerical function to generate the first or the second encoded value based on the same selected authentication key and the intermediate encoded value.

5. The method as claimed in claim 1, wherein the request code includes restriction information, such that the second encoded value matches the first encoded value if the restriction information in the request code included in the instruction code received by the second system matches the restriction information in the request code utilised by the first system to generate the first encoded value.

6. The method as claimed in claim 5, wherein the restriction information comprises one or more of a group consisting of a requested resource, allowed IP address information, and an expiry date.

7. The method as claimed in claim 1, wherein the first and second systems are connected via the Internet, and the instruction code is in the form of an URL.

8. A system for providing secure communication between computing systems, the system comprising:

means for providing a request code by a first system, the request code comprising a file path identifying a resource of a party other than a user requesting a system task associated with said resource;

means for generating a first encoded value by the first system based on the request code, based on a selected authentication key from a plurality of authentication keys stored in a non-volatile manner, and based on a selected length of said file path;

means for providing an instruction code to a second system in a communication session between the first and second systems, the instruction code including the first encoded value, a key data identifying the selected authentication key, the request code, and access level data identifying said selected length of said file path;

means for generating a second encoded value by the second system based on the request code included in the received instruction code, based on said same selected length of said file path, and based on said same selected authentication key from the same plurality of authentication keys stored in a non-volatile manner at the second system for authentication in two or more consecutive communication sessions using the same selected authentication key, said same selected authentication key being identified at the second system based on the key data included in the received instruction code; and means for performing the system task in accordance with the request code if the second encoded value matches the first encoded value included in the received instruction codes;

wherein said access level data identifies a number of folder levels of said file path.

9. The system as claimed in claim 8, wherein the means for providing the instruction code to the second system comprises:

means for presenting the instruction code on a third system to the user requesting said system task for activation; and means for forwarding the instruction code by the third system to the second system upon activation by the user.

10. The system as claimed in claim 8, wherein the means for generating the first encoded value by the first system and the means for generating the second encoded value by the second system utilise a same one-way numerical function.

11. The system as claimed in claim 10, wherein the numerical function comprises a first numerical function to generate an intermediate encoded value based on the request code, and a second numerical function to generate the first or the second encoded value based on the same selected authentication key and the intermediate encoded value.

12. The system as claimed in claim 8, wherein the request code includes restriction information, such that the second encoded value matches the first encoded value if the restriction information in the request code included in the instruction code received by the second system matches the restriction information in the request code utilised by the first system to generate the first encoded value.

13. The system as claimed in claim 12, wherein the restriction information comprises one or more of a group consisting of a requested resource, allowed IP address information, and an expiry date.

14. The system as claimed in claim 8, wherein the first and second systems are connected via the Internet, and the instruction code is in the form of an URL.

15. A method for providing secure communication between computing systems, the method comprising the steps of:

providing a request code by a first system, the request code comprising a file path identifying a resource controlled by a party other than a user requesting a system task associated with said resource;

generating a first encoded value by the first system based on the request code, based on a selected authentication key from a plurality of authentication keys stored in a non-volatile manner at the first system, and based on a selected length of said file path;

providing an instruction code to a second system in a communication session between the first and second systems, the instruction code including the first encoded value, a key data identifying the selected authentication key, the request code, and access level data identifying said selected length of said file path;

generating a second encoded value by the second system based on the request code included in the received instruction code, based on said same selected length of said file path, and based on said same selected authentication key from the same plurality of authentication keys stored in a non-volatile manner at the second system for authentication in two or more consecutive communication sessions using the same selected authentication key, said same selected authentication key being identified at the second system based on the key data included in the received instruction code; and performinq the system task in accordance with the request code if the second encoded value matches the first encoded value included in the received instruction code;

wherein said access level data identifies a number of characters of said file path.

16. The method as claimed in claim 15, wherein the step of providing the instruction code to the second system comprises the steps of:

presenting the instruction code on a third system to the user requesting said system task for activation; and forwarding the instruction code by the third system to the second system upon activation by the user.

17. The method as claimed in claim 15, wherein the steps of generating the first encoded value by the first system and generating the second encoded value by the second system comprise utilising a same one-way numerical function.

18. The method as claimed in claim 17, wherein the numerical function comprises a first numerical function to generate an intermediate encoded value based on the request code, and a second numerical function to generate the first or the second encoded value based on the same selected authentication key and the intermediate encoded value.

19. The method as claimed in claim 15, wherein the request code includes restriction information, such that the second encoded value matches the first encoded value if the restriction information in the request code included in the instruction code received by the second system matches the restriction information in the request code utilised by the first system to generate the first encoded value.

20. The method as claimed in claim 19, wherein the restriction information comprises one or more of a group consisting of a requested resource, allowed IP address information, and an expiry date.

21. The method as claimed in claim 15, wherein the first and second systems are connected via the Internet, and the instruction code is in the form of an URL.

22. A system for providing secure communication between computing systems, the system comprising:

means for providing a request code by a first system, the request code comprising a file path identifying a resource of a party other than a user requesting a system task associated with said resource;

means for generating a first encoded value by the first system based on the request code, based on a selected authentication key from a plurality of authentication keys stored in a non-volatile manner, and based on a selected length of said file path;

means for providing an instruction code to a second system in a communication session between the first and second systems, the instruction code including the first encoded value, a key data identifying the selected authentication key, the request code, and access level data identifying said selected length of said file path;

means for generating a second encoded value by the second system based on the request code included in the received instruction code, based on said same selected length of said file path, and based on said same selected authentication key from the same plurality of authentication keys stored in a non-volatile manner at the second system for authentication in two or more consecutive communication sessions using the same selected authentication key, said same selected authentication key being identified at the second system based on the key data included in the received instruction code; and means for performing the system task in accordance with the request code if the second encoded value matches the first encoded value included in the received instruction code;

wherein said access level data identifies a number of characters of said file path.

23. The system as claimed in claim 22, wherein the means for providing the instruction code to the second system comprises:

means for presenting the instruction code on a third system to the user requesting said system task for activation; and means for forwarding the instruction code by the third system to the second system upon activation by the user.

24. The system as claimed in claim 22, wherein the means for generating the first encoded value by the first system and the means for generating the second encoded value by the second system utilise a same one-way numerical function.

25. The system as claimed in claim 24, wherein the numerical function comprises a first numerical function to generate an intermediate encoded value based on the request code, and a second numerical function to generate the first or the second encoded value based on the same selected authentication key and the intermediate encoded value.

26. The system as claimed in claim 22, wherein the request code includes restriction information, such that the second encoded value matches the first encoded value if the restriction information in the request code included in the instruction code received by the second system matches the restriction information in the request code utilised by the first system to generate the first encoded value.

27. The system as claimed in claim 26, wherein the restriction information comprises one or more of a group consisting of a requested resource, allowed IP address information, and an expiry date.

28. The system as claimed in claim 22, wherein the first and second systems are connected via the Internet, and the instruction code is in the form of an URL.

* * * * *